US008973808B2

(12) United States Patent
Lin et al.

(10) Patent No.: US 8,973,808 B2

(45) Date of Patent: Mar. 10, 2015

(54) METHOD FOR MAKING A CELLULAR SEAL

(75) Inventors: Dechao Lin, Greer, SC (US); Dennis William Cavanaugh, Simpsonville, SC (US); Yan Cui, Greer, SC (US); Srikanth Chandrudu Kottilingam, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 13/344,058

(22) Filed: Jan. 5, 2012

(65) Prior Publication Data

US 2013/0175325 A1 Jul. 11, 2013

(51) Int. Cl.

| | |
|---|---|
| ***B23K 101/00*** | (2006.01) |
| ***B23K 101/02*** | (2006.01) |
| ***B23K 1/00*** | (2006.01) |
| ***B23K 1/20*** | (2006.01) |

(52) U.S. Cl.

USPC ........... 228/157; 228/119; 228/181; 228/182; 228/186

(58) Field of Classification Search

USPC .......................... 228/157, 119, 181, 182, 186

See application file for complete search history.

(56) References Cited

U.S. PATENT DOCUMENTS

| | | | | |
|---|---|---|---|---|
| 2,856,281 | A * | 10/1958 | Cremer et al. | 420/434 |
| 3,084,770 | A * | 4/1963 | Wirsing, Jr. | 428/593 |
| 3,342,563 | A * | 9/1967 | Butts | 75/246 |
| 3,478,413 | A | 11/1969 | Gadd | |
| 5,702,050 | A * | 12/1997 | Oono | 228/212 |
| 2005/0067069 | A1* | 3/2005 | Humm et al. | 148/675 |
| 2007/0000581 | A1* | 1/2007 | Cetel et al. | 148/555 |
| 2009/0126833 | A1 | 5/2009 | Cavanaugh et al. | |
| 2011/0074113 | A1 | 3/2011 | Cavanaugh et al. | |

* cited by examiner

*Primary Examiner* — Erin Saad

(74) *Attorney, Agent, or Firm* — Cantor Colburn LLP

(57) ABSTRACT

A method for making a cellular seal member for a turbine is disclosed. The method includes, in sequence, forming a diffusion aluminide coating on a surface of a cellular seal to form a coated cellular seal. The method also includes brazing the coated cellular seal to a seal substrate.

19 Claims, 5 Drawing Sheets

METHOD FOR MAKING A CELLULAR SEAL

BACKGROUND OF THE INVENTION

The present invention relates to a method of making a cellular (e.g. honeycomb) seal as may be used, for example, in a turbine.

Honeycomb seals are used in multiple locations in various gas turbines. For example, such seals may be used against the rails on shrouded buckets as an abradable material. The temperatures encountered at these locations can be relatively high, including 870° C. or more. Unfortunately, even a honeycomb material made from an oxidation resistant alloy can experience oxidation and a shortening of useful life under these conditions. For this reason, advances in high temperature capabilities have been achieved through the development of iron, nickel and cobalt-based superalloys for making honeycomb materials and the use of oxidation-resistant environmental coatings capable of protecting superalloys from oxidation, hot corrosion, etc. For example, Haynes 214® (provided by Haynes International of Kokomo, Ind.) is an oxidation-resistant alloy constructed from 75 Ni, 16 Cr, 4.5 Al, 3 Fe, 0.05 C, 0.01 Y, 0.5 Mn, 0.2 Si, 0.1 Zr, and 0.01 B (by weight percent). However, even when constructed from this material, the expected life of a honeycomb seal in stage 2 shrouds can be less than 20,000 hours.

Aluminum-containing coatings, particularly diffusion aluminide coatings, have found widespread use as environmental coatings on gas turbine engine components. During high temperature exposure in air, aluminum-containing coatings form a protective aluminum oxide (alumina) scale or layer that inhibits corrosion and oxidation of the coating and the underlying substrate. Diffusion coatings can be generally characterized as having an additive layer that primarily overlies the original surface of the coated substrate and a diffusion zone below the original surface. The additive layer of a diffusion aluminide coating contains the environmentally-resistant intermetallic phase MAl, where M is iron, nickel or cobalt, depending on the substrate material (mainly β(NiAl) if the substrate is Ni-base). The diffusion zone comprises various intermetallic and metastable phases that form during the coating reaction as a result of compositional gradients and changes in elemental solubility in the local region of the substrate.

Diffusion aluminide coatings are generally formed by depositing and diffusing aluminum into the surface of a component at temperatures at or above about 760° C. Notable processes include pack cementation and vapor phase aluminiding (VPA) techniques, and diffusing aluminum deposited by chemical vapor deposition (CVD), slurry coating, or another deposition process. Aluminum deposited by slurry coating is typically diffused without an activator in contrast to the other methods, relying instead on melting and subsequent diffusion of the deposited aluminum.

The processing temperature and whether an activator is used will influence whether a diffusion coating is categorized as an outward-type or inward-type. Outward-type coatings are formed as a result of using higher temperatures (e.g., at or above the solution temperature of the alloy being coated) and lower amounts of activator as compared to inward-type coatings. In the case of a nickel-based substrate, such conditions promote the outward diffusion of nickel from the substrate into the deposited aluminum layer to form the additive layer, and also reduce the inward diffusion of aluminum from the deposited aluminum layer into the substrate, resulting in a relatively thick additive layer above the original surface of the substrate. Conversely, lower processing temperatures and larger amounts of activator reduce the outward diffusion of nickel from the substrate into the deposited aluminum layer and promote the inward diffusion of aluminum from the deposited aluminum layer into the substrate, yielding an inward-type diffusion coating characterized by an additive layer that extends below the original surface of the substrate.

The choice of donor material influences whether an outward or inward-type diffusion coating can be produced since aluminum alloys such as CrAl, CoAl, FeAl, TiAl, etc., have higher melting temperatures than unalloyed aluminum and, therefore, can be used with the higher processing temperatures used to form outward-type coatings. Though both outward and inward-type diffusion aluminide coatings are successfully used, outward-type diffusion aluminide coatings typically have a more ductile and stable nickel aluminide intermetallic phase and exhibit better oxidation and low cycle fatigue (LCF) properties as compared to inward-type diffusion aluminide coatings.

Slurries used to form diffusion aluminide coatings are typically aluminum-rich, containing only an unalloyed aluminum powder in an inorganic binder. The slurry is directly applied to surfaces to be aluminized, and aluminiding occurs as a result of heating the component in a non-oxidizing atmosphere or vacuum to a temperature above about 760° C., which is maintained for a duration sufficient to melt the aluminum powder and diffuse the molten aluminum into the surface. The thickness of a diffusion aluminide coating produced by a slurry method is typically proportional to the amount of the slurry applied to the surface, and as such, the amount of slurry applied must be very carefully controlled.

The difficulty of consistently producing diffusion aluminide coatings of uniform thickness has discouraged the use of slurry processes on components that require a very uniform diffusion coating and/or have complicated geometries. As a result, though capable of forming diffusion aluminide coatings on internal and external surfaces, slurry coating processes have been typically employed to coat limited, noncritical regions of gas turbine engines. Another limitation of slurry coating processes is that, because of the use of unalloyed aluminum, they are typically performed at relatively low temperatures (e.g., below 980° C.), and are therefore limited to producing an inward-type coating with high aluminum content.

A method and composition for coating honeycomb seals and, more specifically, a method and slurry for applying an aluminide coating onto honeycomb seals is described in US2011/0074113 to Cavanaugh et al. The method includes preparing a slurry of a powder containing a metallic aluminum alloy having a melting temperature higher than aluminum, an activator capable of forming a reactive halide vapor with the metallic aluminum, and a binder containing an organic polymer. The slurry is applied to surfaces of the honeycomb seal, which is then heated to remove or burn off the binder, vaporize and react the activator with the metallic aluminum to form the halide vapor, react the halide vapor at the substrate surfaces to deposit aluminum on the surfaces of the seal, and diffuse the deposited aluminum into the surfaces to form a diffusion aluminide coating. While this process is very useful for forming an aluminide coating on honeycomb materials attached to superalloy substrates, various issues have been observed, including entrapment of residue from the aluminiding process in the cells, and migration of braze materials used to attach the cellular seal to the seal substrate within the cells during aluminiding where they may form undesirable compounds. Therefore, an improved method for making aluminized cellular seals is very desirable.

BRIEF DESCRIPTION OF THE INVENTION

According to one aspect of the invention, a method for making a cellular seal for a turbine is disclosed. The method includes, in sequence, forming a diffusion aluminide coating on a surface of a cellular seal to form a coated cellular seal. The method also includes brazing the coated cellular seal to a seal substrate.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

A full and enabling disclosure of the present invention, including the best mode thereof, directed to one of ordinary skill in the art, is set forth in the specification, which makes reference to the appended figures, in which.

Figure 1A:
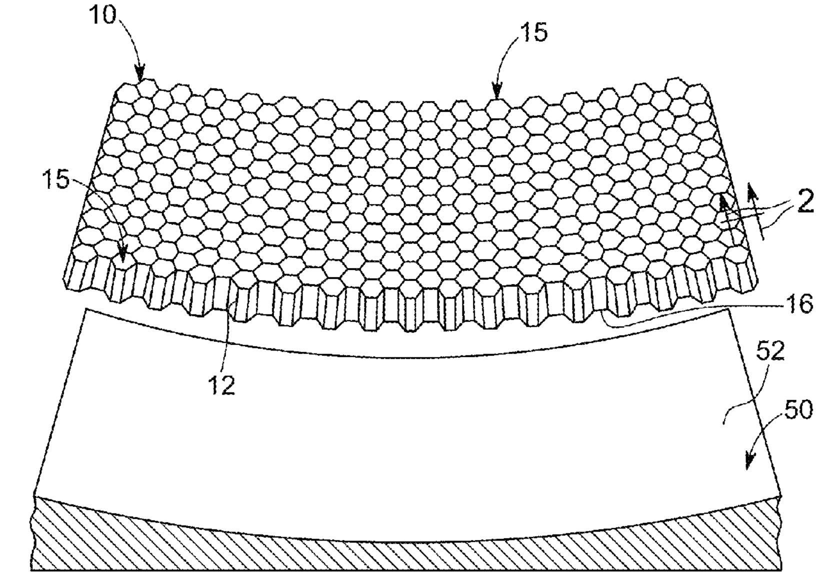
FIGS. 1A-1C are perspective partial cross-sectional views illustrating an exemplary embodiment of a method of making a cellular seal member.
Figure 1B:
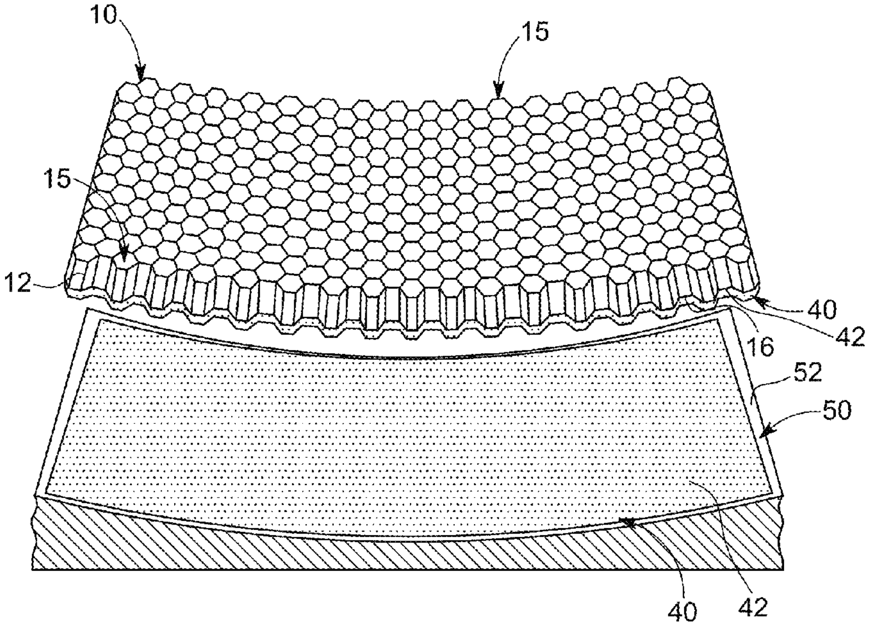

The detailed description explains embodiments of the invention, together with advantages and features, by way of example with reference to the drawings.

DETAILED DESCRIPTION OF THE INVENTION

Referring to the Figures, and particularly FIGS. 1A-1C and 6, in an exemplary embodiment, a method 100 for making a cellular seal member 1 for a turbine is disclosed. The method includes, in sequence, forming 110 a diffusion aluminide coating on a surface of a cellular seal to form a coated cellular seal 10. The method also includes brazing 120 the coated cellular seal 10 to a seal substrate 50 to form the cellular seal member 1. The cellular seal member 1 includes the coated (aluminized) cellular seal 10, the seal substrate 50 and a braze joint 40 formed by brazing 120. The coated cellular seal 10 may have any cellular wall 12 structure, and may include cells 15 having any suitable cross-sectional shape, including various circular or polygonal shapes, such as, for example, rectangular, triangular or other polygonal shapes, and particularly various hexagonal or honeycomb shapes. For purposes of illustration herein, the coated cellular seal 10 is depicted as having a cells 15 that are hexagonal or honeycomb shape and may also be referred to herein as a honeycomb seal 10.

The method 100 includes forming 110 a diffusion aluminide coating 20 on a surface of an uncoated cellular seal to form a coated cellular seal 10. FIG. 1 provides a perspective view of a coated cellular seal 10 on which an aluminide coating 20 has been formed. The coated cellular seal 10 includes a plurality of individual, hexagonally-shaped cells 15. The coated cellular seal 10 may be formed from any suitable high temperature material, including various oxidation and hot corrosion resistant nickel-based, cobalt-based or iron-based superalloys, such as, for example, a nickel-based superalloy comprising 75% Ni, 16% Cr, 4.5% Al, 3% Fe, 0.05% C, 0.01% Y, 0.5% Mn, 0.2% Si, 0.1% Zr, and 0.01% B (in weight percent) sold commercially as e.g., Haynes 214®. The coated cellular seal 10 is configured to encounter conditions during operation of the gas turbine engine that can cause severe oxidation, corrosion and erosion.

Figure 2:
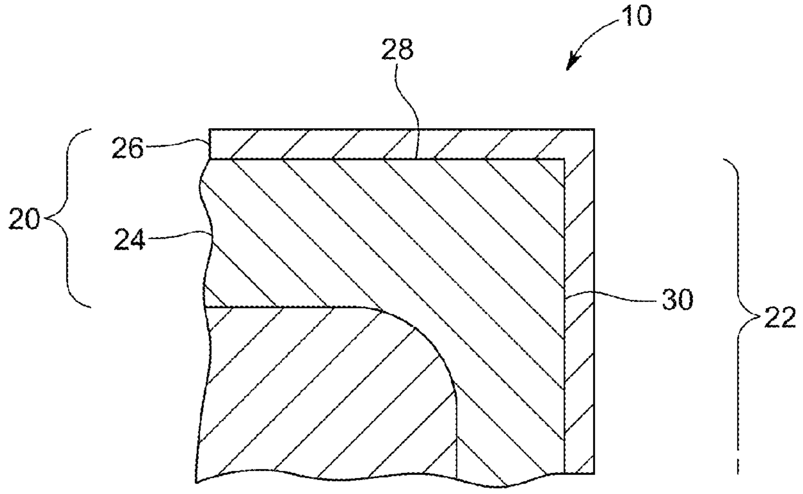
FIG. 2 is a partial cross-sectional view of section 2-2 of FIG. 1A illustrating a portion of a cellular seal illustrating an exemplary embodiment of a diffusion aluminide coating as may be applied to an internal or an external surface of the seal, or to both surfaces.

Coated cellular seal 10 is protected from the hostile environment of the turbine section by the diffusion aluminide coating 20, shown in FIG. 2 as being formed on a substrate region 22 of the coated cellular seal 10. The substrate region 22 may be the base superalloy of the coated cellular seal 10, or an overlay coating such as MCrAlY deposited by known methods on the surface of the coated cellular seal 10. When subjected to sufficiently high temperatures in an oxidizing atmosphere, the aluminide coating 20 develops an alumina ($Al_2O_3$) layer or scale (not shown) on its surface that inhibits oxidation of the diffusion coating 20 and the underlying substrate region 22. The diffusion aluminide coating 20 overlies all surfaces 28, 29, 30, 31 of the individual cells 15 of coated cellular seal 10.

The surfaces of the coated cellular seal 10 may be further protected by a thermal barrier coating (TBC) deposited on the aluminide coating 20, and the method 100 may optionally include depositing 130 a TBC on the coated cellular seal 10. The TBC may be deposited by thermal spraying such as air plasma spraying (APS), low pressure plasma spraying (LPPS) and HVOF, or by a physical vapor deposition technique such as electron beam physical vapor deposition (EB-PVD). Preferred TBC materials are zirconia partially stabilized with yttria (yttria-stabilized zirconia, or YSZ), though zirconia fully stabilized with yttria could be used, as well as zirconia stabilized by other oxides.

The aluminide coating 20 is represented in FIG. 2 as having two distinct zones, an outermost of which is an additive layer 26 that contains environmentally-resistant intermetallic phases such as MAl, where M is iron, nickel or cobalt, depending on the substrate material. The chemistry of the additive layer 26 may be modified by the addition of elements, such as chromium, silicon, platinum, rhodium, hafnium, yttrium and zirconium, for the purpose of modifying the environmental and physical properties of the coating 20. A typical thickness for the additive layer 26 is up to about 75 micrometers.

Beneath the additive layer 26 is a diffusion zone (DZ) 24 that typically extends about 25 to 50 micrometers into the substrate region 22. The diffusion zone 24 comprises various intermetallic and metastable phases that form during the coating reaction as a result of compositional or diffusional gradients and changes in elemental solubility in the local region of the substrate. These phases are distributed in a matrix of the substrate material.

The diffusion aluminide coating 20 may be formed by any suitable method of forming. In an exemplary embodiment, the diffusion aluminide coating 20 is formed by a slurry process by which aluminum is deposited and diffused into the surfaces 28 and 30 to form aluminide intermetallics. The slurry process makes use of an aluminum-containing slurry, the composition of which includes a donor material containing metallic aluminum, a halide activator, and a binder containing an organic polymer. Notably missing from the ingredients of the slurry compositions are inert fillers and inorganic binders. In the absence of inert fillers, whose particles are prone to sintering, the coating process and slurry composition of this invention are well-suited for use on an uncoated cellular seal to form the coated cellular seal 10 of FIGS. 1A-4.

Suitable donor materials are aluminum alloys with higher melting temperatures than aluminum (melting point of about 660° C.). Particularly suitable donor metals include metallic aluminum alloyed with chromium, cobalt, iron, and/or another aluminum alloying agent with a sufficiently higher melting point so that the alloying agent does not deposit during the diffusion aluminiding process, but instead serves as an inert carrier for the aluminum of the donor material. Preferred donor materials are chromium-aluminum alloys.

An alloy that appears to be particularly well-suited for diffusion processes performed over the wide range of temperatures contemplated by this invention is believed to be 56Cr-44Al (about 44 weight percent aluminum, the balance chromium and incidental impurities). The donor material is in the form of a fine powder to reduce the likelihood that the donor material would become lodged or entrapped within the cellular seal during the coating process. For this reason, a preferred particle size for the donor material powder is −200 mesh (a maximum dimension of not larger than 74 micrometers), though it is foreseeable that powders with a mesh size of as large as 100 mesh (a maximum dimension of up to 149 micrometers) could be used.

Figure 3:
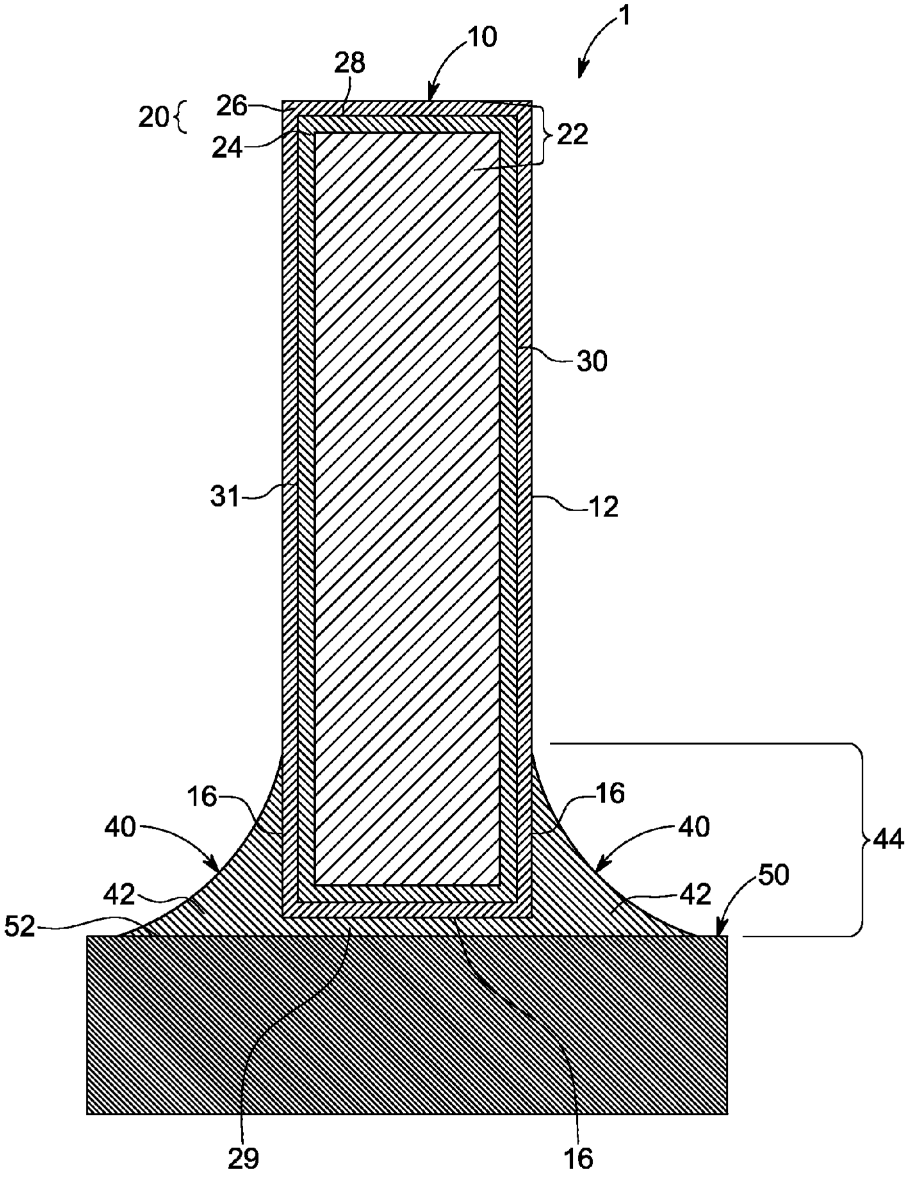
FIG. 3 is a cross-sectional view of section 3-3 of FIG. 1C illustrating an exemplary embodiment of a braze joint as disclosed herein.
Figure 4:
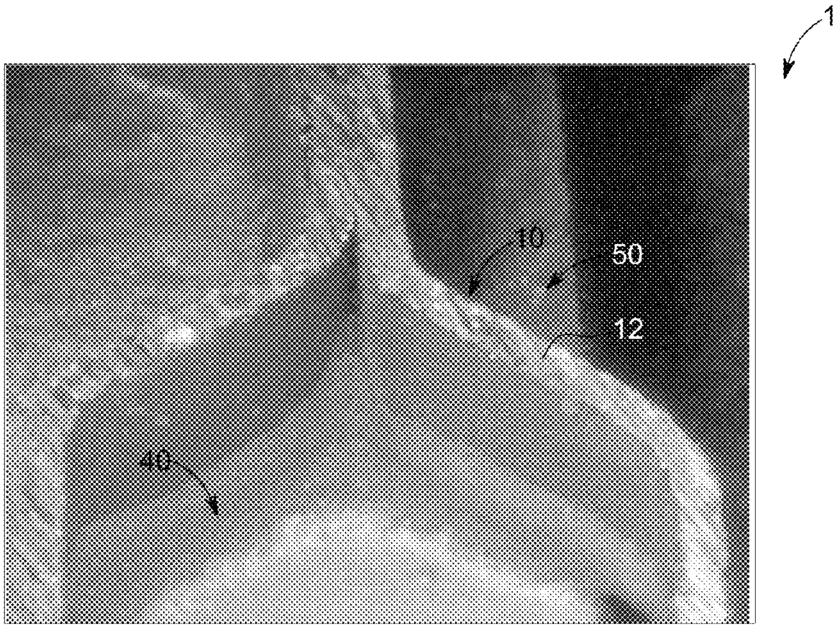
FIG. 4 is a photograph of an exemplary embodiment of a cellular seal member and braze joint as disclosed herein.

Suitable halide activators include ammonium chloride ($NH_4Cl$), ammonium fluoride ($NH_4F$), and ammonium bromide ($NH_4Br$), though the use of other halide activators is also believed to be possible. Suitable activators must be capable of reacting with aluminum in the donor material to form a volatile aluminum halide (e.g., $AlCl_3$, $AlF_3$) that reacts at the surfaces (e.g., used to form surfaces 28 and 30) of the uncoated cellular seal to deposit aluminum, which is then diffused into the surfaces 28 and 30 to form the diffusion aluminide coating 20 and coated cellular seal 10 as shown in FIGS. 2 and 3. A preferred activator for a given process will depend on what type of aluminide coating desired. For example, chloride activators promote a slower reaction to produce a thinner and/or outward-type coating, whereas fluoride activators promote a faster reaction capable of producing thicker and/or inward-type coatings. For use in the slurry, the activator is in a fine powder form. In some embodiments of the invention, the activator powder is preferably encapsulated to inhibit the absorption of moisture.

Suitable binders preferably consist essentially or entirely of alcohol-based or water-based organic polymers. A preferred aspect of the invention is that the binder is able to burn off entirely and cleanly at temperatures below that required to vaporize and react the halide activator, with the remaining residue being essentially in the form of an ash that can be easily removed, for example, by forcing a gas such as air over the surfaces (e.g., surfaces 28 and 30) following the diffusion process. As used herein, "burn" or "burn off" means raising the temperature to a point where the binder is removed by evaporating or boiling off The use of a water-based binder generally necessitates the above-noted encapsulation of the activator powder to prevent dissolution, while the use of an alcohol-based binder does not. Commercial examples of suitable water-based organic polymeric binders include a polymeric gel available under the name Vitta Braz-Binder Gel available from the Vitta Corporation. Suitable alcohol-based binders can be low molecular weight polyalcohols (polyols), such as polyvinyl alcohol (PVA). The binder may also incorporate a cure catalyst or accelerant such as sodium hypophosphite. It is foreseeable that other alcohol or water-based organic polymeric binders could also be used.

Suitable slurry compositions for use with this invention have a solids loading (donor material and activator) of about 10 to about 80 weight percent, with the balance binder. More particularly, suitable slurry compositions of this invention contain, by weight, about 35 to about 65% donor material powder, about 25 to about 60% binder, and about 1 to about 25% activator. More preferred ranges are, by weight, about 35 to about 65% donor material powder, about 25 to about 50% binder, and about 5 to about 25% activator. Within these ranges, the slurry composition has consistencies that allow its application to the external and internal surfaces of an uncoated cellular seal by a variety of methods, including spraying, dipping, brushing, injection, etc. where it can then be diffused to form the diffusion aluminide coating 20 on the surfaces 28, 29, 30 and 31 as described herein.

In one exemplary aspect of the invention, slurries can be applied to have a non-uniform green state (i.e., undried) thicknesses, yet produce diffusion aluminide coatings of very uniform thickness. For example, slurry coatings deposited to have thicknesses of about 0.010 inch (about 0.25 mm) to about 1 inch (about 25 mm) and greater have been shown to produce diffusion aluminide coatings whose thicknesses are very uniform, for example, varying by as little as about 0.0005 inch (about 0.01 mm) or less.

As a result, slurry compositions of this invention can be applied to an uncoated cellular seal by brushing onto uncoated seal including application into the cells. Slurry compositions can also be applied by any suitable application method, including dipping an uncoated cellular seal into the slurry such as e.g., filling a trough or container with the slurry and placing the uncoated cellular seal face down into the slurry so that the cells are filled. By way of further example, slurry may be applied by pouring over an uncoated cellular seal to fill individual cells. The slurry could be applied to the cellular seal 10 by spraying onto all cells. The slurry could also be applied by pumping the slurry into the cells individually or all at one time. For some methods, the viscosity of the slurry may be decreased to facilitate application. Combinations of these and other techniques may be used to apply the slurry as well.

Another advantageous aspect of certain embodiments of the present invention is that the slurry coating composition is capable of producing diffusion aluminide coatings 20 over a broad range of diffusion treatment temperatures, generally in a range of about 815° C. to about 1150° C. Within this broad range, the diffusion temperature can be tailored to preferentially produce either an inward or outward-type coating, along with the different properties associated with these different types of coatings.

For example, the high temperature capability of the slurry composition of this invention enables the production of an outward-type diffusion aluminide coating which, as previously noted, is typically more ductile, has a more stable nickel aluminide intermetallic phase, and exhibits better oxidation and LCF properties as compared to inward-type diffusion aluminide coatings. It is believed the particular types and amounts of donor material and activator can also be used to influence whether an inward or outward-type coating is produced within the above-noted treatment temperature range.

After applying the slurry to the surfaces (e.g. surfaces 28 and 30 as shown in FIG. 2) of the uncoated cellular seal, the slurry-coated cellular seal can be immediately placed in a coating chamber (retort) to perform the diffusion process. Additional coating or activator materials are not required to be present in the retort, other than what is present in the slurry. The retort is evacuated and preferably backfilled with an inert or reducing atmosphere (such as argon or hydrogen, respectively). The temperature within the retort is then raised to a temperature sufficient to burn off the binder, for example about 150° C. to about 200° C., with further heating being performed to attain the desired diffusion temperature as described above, during which time the activator is volatilized, the aluminum halide is formed, aluminum is deposited on the surfaces (e.g., surfaces 28 and 30) to form the coated cellular seal 10. The coated cellular seal 10 is held at the diffusion temperature for a duration of about one to about eight hours, again depending on the final thickness desired for the coating 20.

Following the coating process, the coated cellular seal 10 is removed from the retort and cleaned of any residues from the coating process remaining in and on the coated cellular seal 10. Such residues have been observed to be essentially limited to an ash-like residue of the binder and residue of donor material particles, the latter of which is primarily the metallic constituent (or constituents) of the donor material other than aluminum. In any case, the residues remaining following the coating process of this invention have been found to be readily removable, such as with forced gas flow, without resorting to more aggressive removal techniques such as wire brushing, glass bead or oxide grit burnishing, high pressure water jet, or other such methods that entail physical contact with a solid or liquid to remove firmly attached residues. Because of the ease with which the residues can be removed, the coating process of this invention is well suited for depositing aluminide coatings on surfaces (such as e.g., the surfaces of the coated cellular seal 10 that are internal) that cannot be reached by the aforementioned aggressive surface treatments.

The thickness of the aluminide coating 20 may be controlled by controlling the initial thickness of the additive layer 26, as well as the temperature and time for which the aluminiding is performed. For example, treatment between 927° C. and 1093° C. for between about 2 to about 12 hours resulted in coating thicknesses on the seals of about 1.6 mils to about 2.6 mils.

Figure 1C:
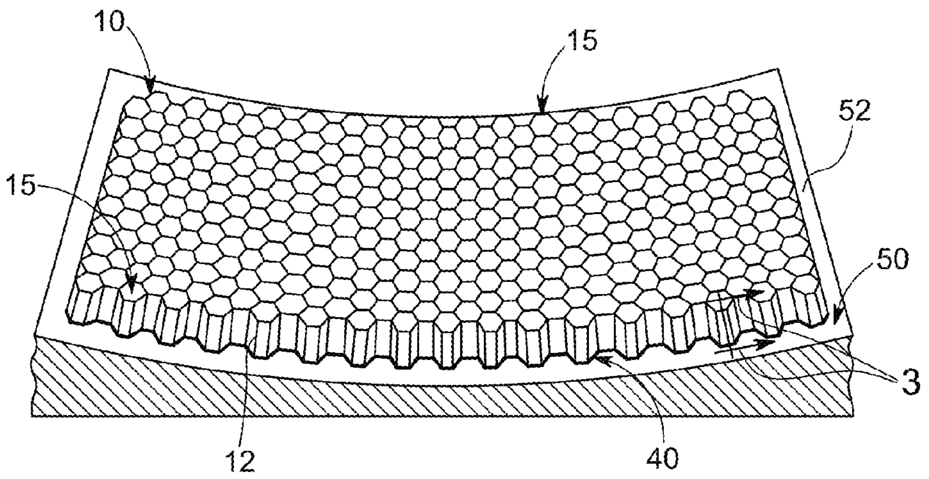

Referring again to FIGS. 1A-1C, the method 100 also includes brazing 120 the coated cellular seal 10 to a seal substrate 50. The seal substrate 50 may be any suitable high temperature material, and in an exemplary embodiment may include various oxidation and hot corrosion resistant nickel-based, cobalt-based or iron-based superalloys, as described herein. The seal substrate 50 may comprise any suitable substrate shape or form, including those of various turbine engine components, and more particularly, may include a turbine shroud or liner. The seal substrate 50 has a substrate brazing surface 52 that is configured to receive a seal brazing surface 16 of the coated cellular seal 10. Brazing 120 may be performed by any suitable method. In an exemplary embodiment, brazing 120 may include applying a braze material 42 (FIG. 1B) to at least one of the coated cellular seal 10 or the seal substrate 50 and heating the braze material 42, seal substrate 50 and coated cellular seal 10 sufficiently to form a braze joint 40 (FIG. 1C). Braze material 42 may include any suitable high temperature braze material, and in an exemplary embodiment braze material may include a nickel-based, cobalt-based or iron-based superalloy. In one embodiment, braze material 42 includes a nickel-based superalloy having a composition, in weight percent of the alloy, of 7% Cr, 4.5% Si, 3% Fe, 3% B and the balance Ni and incidental impurities.

Figure 5:
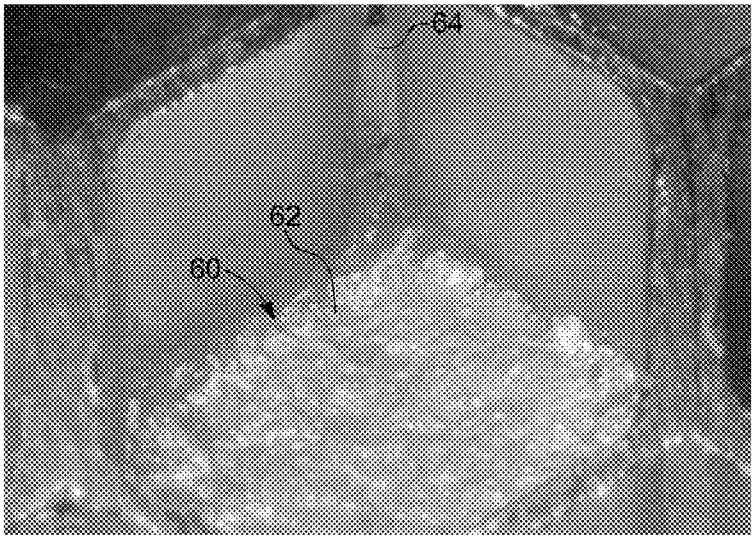
FIG. 5 is a photograph of comparative cellular seal member and braze joint.
Figure 6:
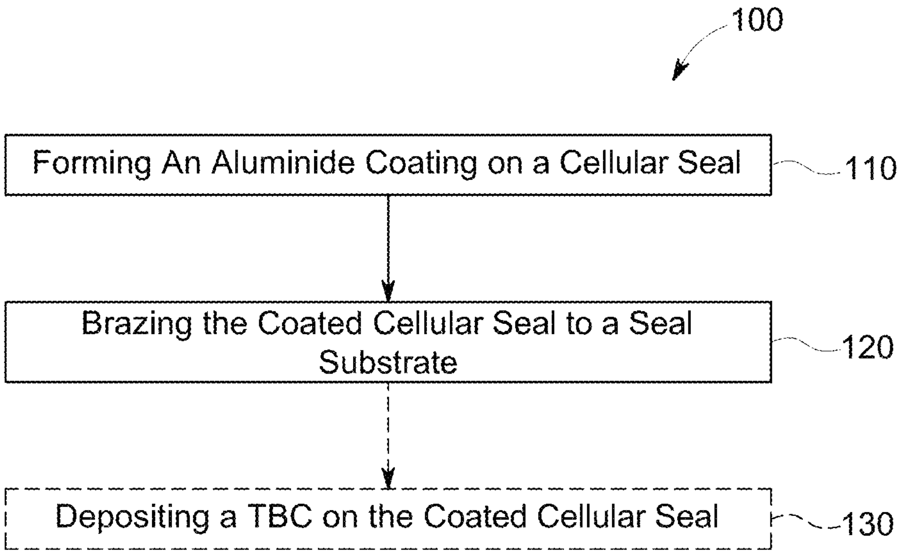
FIG. 6 is a flow chart of an exemplary embodiment of a method of making a cellular seal as disclosed herein.

In an exemplary embodiment, heating the braze material 42, seal substrate 50 and coated cellular seal 10 sufficiently to form a braze joint 40 comprises heating to a temperature of about 1046° C. (1915° F.) for about 5 minutes. In an exemplary embodiment, the braze material 42 may be applied as a sheet or foil to either or both of the seal substrate 50 or the coated cellular seal 10, and may be held in place by a tack weld or other temporary joint. In another embodiment, the braze material may be applied to either or both of the seal substrate 50 or the coated cellular seal 10 as a powder, paste, slurry or the like by painting, dipping, spraying, screen printing, calendar rolls or any other suitable method of application. The braze joint 40 is shown schematically in FIGS. 1C and 3 and in the photograph of FIG. 4. The formation of the aluminide layer 20 on the coated cellular seal 10 prior to brazing 120 is very advantageous because the braze material 42 tends to form a fillet 44 and wetting of the walls 12 of the cellular seal is limited to the area of the fillet 44, which is proximate the seal brazing surface 16 of the cellular seal and the substrate brazing surface 52 of the seal substrate 50. It also enables the braze material 42 to have a lower melting point and the brazing 120 to be performed at a lower temperature than is the case if the aluminiding is performed after brazing. This is in contrast to what may occur if the braze joint 60 is formed prior forming the aluminide coating on the uncoated cellular seal as shown comparatively in FIG. 5. In this case, forming the aluminide coating causes the braze material 62 to remelt and be transported by capillarity or other transport mechanisms away from the surfaces and along the corners or edges of the cells away from the braze joint. This action weakens the braze joint and causes the formation of brittle phases 64 along the edges, which can impede the action of the seal or cause greater wear of turbine components that touch the degradable seal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for making a cellular seal member for a turbine, comprising, in sequence:

forming a diffusion aluminide coating on all surfaces of a cellular seal comprising a plurality of cells and corresponding cell walls to form a coated cellular seal, one of the surfaces comprising a seal brazing surface; and brazing the seal brazing surface of the coated cellular seal to a substrate brazing surface of seal substrate with a braze material comprising a nickel-based, cobalt-based or iron-based superalloy to form a braze joint between the seal brazing surface and the substrate brazing surface, the braze joint comprising a fillet proximate the substrate brazing surface of the substrate between the seal brazing surface of the coated cellular seal and the substrate brazing surface, wetting of the cell walls of the cellular seal by the braze material is limited to the fillet, and transport of the braze material away from the seal brazing surface and fillet to other surfaces of the cellular seal and the formation of brittle phases by the braze material on other surfaces of the coated cellular seal is avoided.

2. A method according to claim 1, wherein the seal substrate comprises a component of a turbine engine.

3. A method according to claim 2, wherein the component comprises a turbine shroud, bucket nozzle, liner or seal.

4. A method according to claim 2, wherein the component comprises a nickel-based, cobalt-based or iron-based superalloy.

5. A method according to claim 1, wherein brazing comprises:

applying a braze material to at least one of the cellular seal or the seal substrate; and heating the braze material, seal substrate and cellular seal sufficiently to form a braze joint.

6. A method according to claim 1, wherein heating comprises heating to a temperature of about 1915° F. for about 5 minutes.

7. A method according to claim 1, wherein forming the diffusion aluminide coating comprises:

preparing a gel aluminide slurry comprising a powder containing a metallic aluminum alloy having a melting temperature higher than aluminum, an activator capable of forming a reactive halide vapor with aluminum in the aluminum alloy, and a binder containing at least one organic polymer;

applying the gel aluminide slurry onto the surfaces of the cellular seal;

heating the cellular seal to remove the binder, vaporize and react the activator with the metallic aluminum to form the halide vapor, react the halide vapor at the surfaces of the honeycomb seal to deposit aluminum on the surfaces, and diffuse the deposited aluminum into the surfaces of the honeycomb seal to form a diffusion aluminide coating, wherein the binder is removed to form a readily removable ash residue.

8. A method according to claim 7, wherein the powder contains a chromium-aluminum alloy.

9. A method according to claim 7, wherein the powder has a particle size of up to 100 mesh.

10. A method according to claim 7, wherein the activator is chosen from the group consisting of ammonium chloride, ammonium fluoride, and ammonium bromide.

11. A method according to claim 7, wherein the binder consists of the at least one organic polymer.

12. A method according to claim 7, wherein the slurry consists essentially of, by weight, about 35 to about 65% of the powder, about 1 to about 25% of the activator, and about 25 to about 60% of the binder.

13. A method according to claim 1, wherein the surface comprise at least one internal surface within the cellular seal.

14. A method according to claim 1, wherein the surface comprise at least one external surface of the cellular seal.

15. A method according to claim 1, wherein the surface comprises an internal surface within the cellular seal and an external surface of the cellular seal.

16. A method according to claim 7, wherein the cellular seals with gel aluminide slurry are heated to a temperature within a range of about 815° C. to about 1150° C.

17. A method according to claim 1, wherein the diffusion aluminide coating is an inward-type coating or an outward-type coating.

18. A method according to claim 1, further comprising depositing a TBC coating on the coated cellular seal following brazing.

19. A method according to claim 1, wherein the cellular seal is formed of a nickel-based superalloy, a Co-based superalloy, or a Fe-based superalloy.

* * * * *